United States Patent
He et al.

(10) Patent No.: US 12,022,432 B2
(45) Date of Patent: Jun. 25, 2024

(54) PAGING OCCASION PARTITIONING

(71) Applicant: QUALCOMM Incorporated, San Diego, CA (US)

(72) Inventors: Linhai He, San Diego, CA (US); Peter Pui Lok Ang, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/499,719

(22) Filed: Oct. 12, 2021

(65) Prior Publication Data

US 2023/0113113 A1   Apr. 13, 2023

(51) Int. Cl.
    *H04W 68/02* (2009.01)
(52) U.S. Cl.
    CPC .................. *H04W 68/02* (2013.01)
(58) Field of Classification Search
    CPC .................................... H04W 68/02
    USPC ........................................ 455/458
    See application file for complete search history.

(56) References Cited

U.S. PATENT DOCUMENTS

| | | | |
|---|---|---|---|
| 2011/0312347 A1* | 12/2011 | Dinan | H04W 68/02 455/458 |
| 2020/0389874 A1* | 12/2020 | Lin | H04L 5/0096 |
| 2022/0046582 A1* | 2/2022 | Shrivastava | H04W 68/02 |
| 2023/0015708 A1* | 1/2023 | Gurumoorthy | H04W 76/27 |

FOREIGN PATENT DOCUMENTS

| | | |
|---|---|---|
| WO | 2020061933 A1 | 4/2020 |
| WO | 2020091643 A1 | 5/2020 |
| WO | 2020160272 | 8/2020 |

OTHER PUBLICATIONS

International Search Report and Written Opinion—PCT/US2022/044940—ISA/EPO—dated Jan. 26, 2023.
Lenovo, et al., "Paging Enhancement for UE Power Saving", 3GPP TSG RAN WG1 Meeting #1 06bis-e, R1-2109944, 3rd Generation Partnership Project, Mobile Competence Centre, 650, Route Des Lucioles, F-06921 Sophia-Antipolis Cedex, France, vol. RAN WG1, No . e-Meeting, Oct. 11, 2021-Oct. 19, 2021, Oct. 2, 2021, 4 Pages, XP052058862, The whole document.
Mediatek Inc: "Report of [AT114-e][025][ePowSav] Subgrouping Network Architecture", 3GPP TSG-RAN WG2 Meeting #114 electronic, R2-2106666, 3rd Generation Partnership Project, Mobile Competence Centre, 650, Route Des Lucioles, F-06921 Sophia-Antipolis Cedex, France, vol. RAN WG2, No. Electronic, May 19, 2021-May 27, 2021, May 25, 2021, 22 Pages, XP052013867, paragraph [2.1(q1.1)]—paragraph 2.2 and 2.3.

(Continued)

*Primary Examiner* — Joel Ajayi
(74) *Attorney, Agent, or Firm* — Seyfarth Shaw LLP

(57) ABSTRACT

A method for wireless communication performed by a user equipment (UE) includes transmitting, to a core network, a request for a preferred assignment of a paging occasion subgroup. The method also includes receiving, from the core network, a response indicating whether the request is granted. The method further includes monitoring a first paging occasion within a first paging frame associated with the paging occasion subgroup based on the response indicating the request is granted.

30 Claims, 9 Drawing Sheets

(56) References Cited

OTHER PUBLICATIONS

VIVO: "Paging Enhancements for Idle/inactive Mode UE Power Saving", 3GPP TSG RAN WG1 #1 06bis-e, R1-2108985, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, 10 Pages, XP052057946, paragraphs 2, 3, 4 and 6.

* cited by examiner

PAGING OCCASION PARTITIONING

FIELD OF THE DISCLOSURE

The present disclosure relates generally to wireless communications, and more specifically to partitioning paging occasions.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method for wireless communication, performed by a user equipment (UE), is disclosed. The method includes transmitting, to a core network, a request for a preferred assignment of a paging occasion subgroup. The method also includes receiving, from the core network, a response indicating whether the request is granted. The method further includes monitoring a first paging occasion within a first paging frame associated with the paging occasion subgroup based on the response indicating the request is granted.

Another aspect of the present disclosure is directed to an apparatus including means for transmitting, to a core network, a request for a preferred assignment of a paging occasion subgroup. The apparatus also includes means for receiving, from the core network, a response indicating whether the request is granted. The apparatus further includes means for monitoring a first paging occasion within a first paging frame associated with the paging occasion subgroup based on the response indicating the request is granted.

In another aspect of the present disclosure, a non-transitory computer-readable medium with non-transitory program code recorded thereon is disclosed. The program code is for wireless communication at a UE. The program code is executed by a processor and includes program code to transmit, to a core network, a request for a preferred assignment of a paging occasion subgroup. The program code also includes program code to receive, from the core network, a response indicating whether the request is granted. The program code further includes program code to monitor a first paging occasion within a first paging frame associated with the paging occasion subgroup based on the response indicating the request is granted.

Another aspect of the present disclosure is directed to an apparatus. The apparatus having a memory, one or more processors coupled to the memory, and instructions stored in the memory. The instructions being operable, when executed by the processor, to cause the apparatus to transmit, to a core network, a request for a preferred assignment of a paging occasion subgroup. Execution of the instructions also cause the apparatus to receive, from the core network, a response indicating whether the request is granted. Execution of the instructions additionally cause the apparatus to monitor a first paging occasion within a first paging frame associated with the paging occasion subgroup based on the response indicating the request is granted.

In one aspect of the present disclosure, a method for wireless communication, by a base station, is disclosed. The method includes transmitting, via system information, a subgroup support message indicating support for paging occasion subgroups. The method also includes transmitting, for each paging occasion subgroup supported by the base station, a set of paging occasion subgroup parameters. The method further includes receiving a subgroup preference message indicating a preferred paging occasion subgroup of a UE. The method still further includes transmitting a paging occasion within a paging frame associated with the preferred paging occasion subgroup based on the paging occasion subgroup parameters.

Another aspect of the present disclosure is directed to an apparatus including means for transmitting, via system information, a subgroup support message indicating support for paging occasion subgroups. The apparatus also includes means for transmitting, for each paging occasion subgroup supported by the base station, a set of paging occasion subgroup parameters. The apparatus further includes means for receiving a subgroup preference message indicating a preferred paging occasion subgroup of a UE. The apparatus still further includes means for transmitting a paging occasion within a paging frame associated with the preferred paging occasion subgroup based on the paging occasion subgroup parameters.

In another aspect of the present disclosure, a non-transitory computer-readable medium with non-transitory program code recorded thereon is disclosed. The program code is for wireless communication by a base station. The program code is executed by a processor and includes program code to transmit, via system information, a subgroup support message indicating support for paging occasion subgroups. The program code also includes program code to transmit, for each paging occasion subgroup supported by the base station, a set of paging occasion subgroup parameters. The program code further includes program code to receive a subgroup preference message indicating a preferred paging occasion subgroup of a UE. The program code still further includes program code to transmit a paging occasion within a paging frame associated with the preferred paging occasion subgroup based on the paging occasion subgroup parameters.

Another aspect of the present disclosure is directed to an apparatus. The apparatus having a memory, one or more processors coupled to the memory, and instructions stored in the memory. The instructions being operable, when executed by the processor, to cause the apparatus to transmit, via system information, a subgroup support message indicating support for paging occasion subgroups. Execution of the instructions also cause the apparatus to transmit, for each paging occasion subgroup supported by the base station, a set of paging occasion subgroup parameters. Execution of the instructions additionally cause the apparatus to receive a subgroup preference message indicating a preferred paging occasion subgroup of a UE. Execution of the instructions further cause the apparatus to transmit a paging occasion within a paging frame associated with the preferred paging occasion subgroup based on the paging occasion subgroup parameters.

In one aspect of the present disclosure, a method for wireless communication, by a core network, is disclosed. The method includes receiving, from a UE, a request for a preferred assignment of a paging occasion subgroup. The method also includes transmitting, to a base station, the preferred assignment of the paging occasion subgroup. The method further includes transmitting, to the UE, a response indicating whether the request is granted.

Another aspect of the present disclosure is directed to an apparatus including means for receiving, from a UE, a request for a preferred assignment of a paging occasion subgroup. The apparatus also includes means for transmitting, to a base station, the preferred assignment of the paging occasion subgroup. The apparatus further includes means for transmitting, to the UE, a response indicating whether the request is granted.

In another aspect of the present disclosure, a non-transitory computer-readable medium with non-transitory program code recorded thereon is disclosed. The program code is for wireless communication by a core network. The program code is executed by a processor and includes program code to receive, from a UE, a request for a preferred assignment of a paging occasion subgroup. The program code also includes program code to transmit, to a base station, the preferred assignment of the paging occasion subgroup. The program code further includes program code to transmit, to the UE, a response indicating whether the request is granted.

Another aspect of the present disclosure is directed to an apparatus. The apparatus having a memory, one or more processors coupled to the memory, and instructions stored in the memory. The instructions being operable, when executed by the processor, to cause the apparatus to receive, from a UE, a request for a preferred assignment of a paging occasion subgroup. Execution of the instructions also cause the apparatus to transmit, to a base station, the preferred assignment of the paging occasion subgroup. Execution of the instructions additionally cause the apparatus to transmit, to the UE, a response indicating whether the request is granted.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
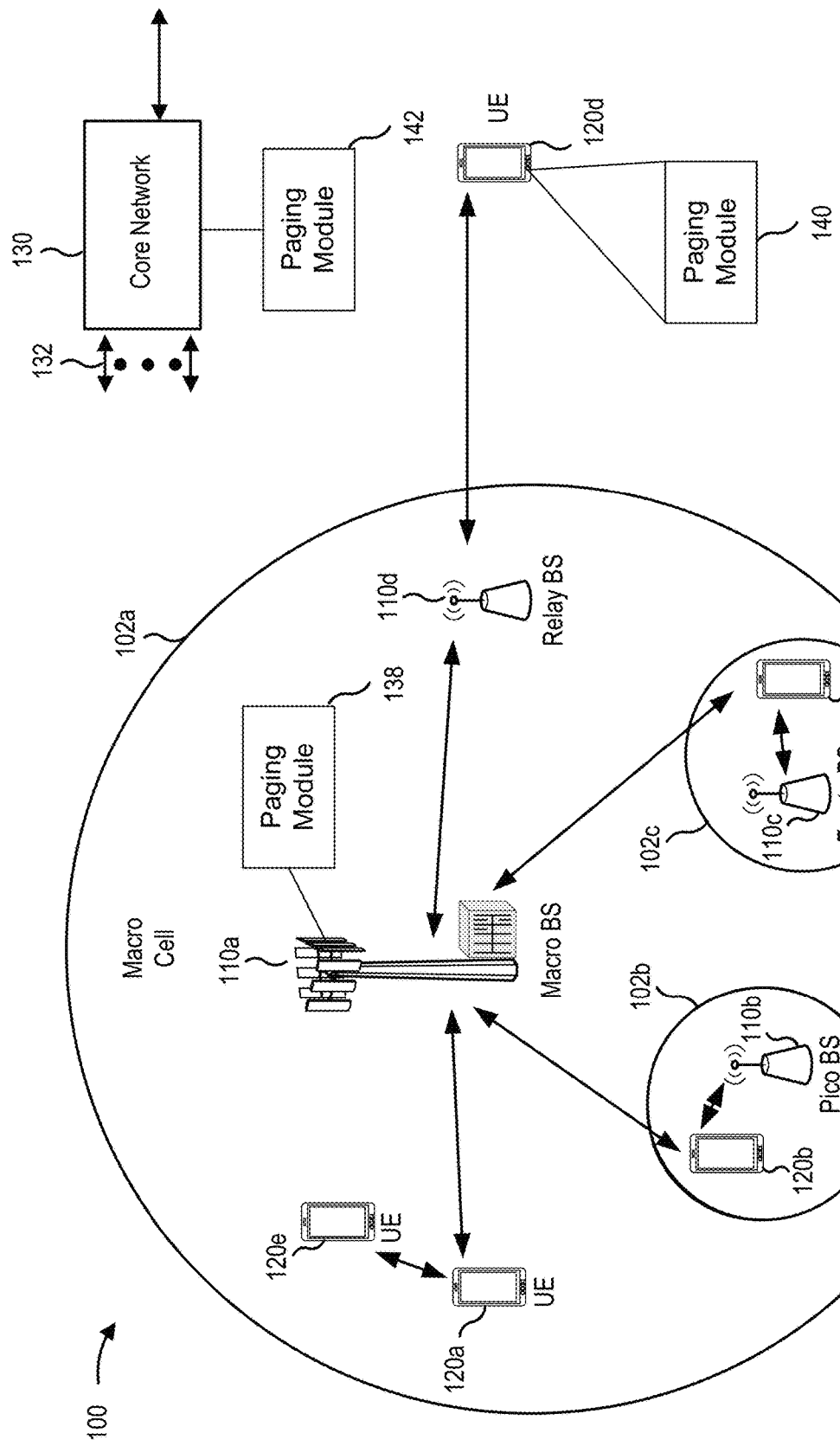
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless communication systems, such as 5G NR systems, may specify various parameters for a paging channel. Such parameters may be used by a user equipment (UE) to monitor a physical downlink channel for one or more paging messages (for example, a paging occasion within a paging frame). A paging frame (PF) is an example of a radio frame that contains one or more paging occasions (PO). In some examples, the parameters may include a periodicity (T) for monitoring paging occasions. The UE may wake up from idle mode to read paging messages based on the periodicity (T). The UE may derive the periodicity (T) based on a cell's default paging cycle or one of a UE-specific discontinuous reception (DRX) cycle or extended DRX (eDRX) configuration. Values of the periodicity (T) may include 640 ms, 1280 ms, 2560 ms, and 5120 ms. In the present disclosure, the periodicity (T) may also be referred to as a paging cycle.

A wireless communication network, such as a base station and/or core network, may configure a number (N) of paging frames per paging cycle and also a start offset (PF_offset) for a start location of the paging frame within one paging cycle. A radio frame may be considered a paging frame if the radio frame satisfies the following criteria:

$$(SFN+PF\_offset) \bmod T = (T \text{ div } N)*(UE\_ID \bmod N), \quad (1)$$

where the parameter SFN represents a number of the radio frame (for example, system frame number), and the parameter UE_ID represents the UE's ID assigned by a core network (CN).

A paging frame may include one or more paging occasions. A paging occasion may be a set of physical downlink control channel (PDCCH) monitoring occasions. In some examples, the paging occasion consists of multiple time slots. A paging indication may be transmitted to the UE in the paging occasion. The UE may be assigned to one paging occasion with each paging cycle. In conventional systems, within each paging frame, the UE may be randomly assigned to a paging occasion based on a hash of its UE_ID. The hash of the UE_ID may be as follows:

$$i\_s = \text{floor}(UE\_ID/N) \bmod Ns, \quad (2)$$

where the parameter i_s represents an index of a paging occasion within a paging frame, and the parameter Ns represents a number of paging occasions within a paging frame. In some examples, paging messages for UEs sharing the same paging occasion are multiplexed in a single physical downlink shared channel (PDSCH).

In conventional wireless communication systems, UEs may be indifferently assigned to one of the paging occasions based on a respective UE_ID. It may be desirable to assign one or more UEs to a specific set of paging occasions.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types (for example, macro BSs, pico BSs, femto BSs, relay BSs, and/or the like). These different types of BSs may have different transmit power levels, different coverage areas, and different impact on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

As an example, the BSs 110 (shown as BS 110*a*, BS 110*b*, BS 110*c*, and BS 110*d*) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a paging module 140. For brevity, only one UE 120*d* is shown as including the paging module 140. The paging module 140 may transmit, to a core network, a request for a preferred assignment of a paging occasion subgroup; receive, from the core network, a response indicating whether the request is granted; and monitor a first paging occasion within a first paging frame associated with the paging occasion subgroup based on the response indicating the request is granted The base stations 110 may include a paging module 138. For brevity, only one base station 110*a* is shown as including the paging module 138. The paging module 138 may transmit, via system information, a subgroup support message indicating support for paging occasion subgroups; transmit, for each paging occasion subgroup supported by the base station, a set of paging occasion subgroup parameters; receive a subgroup preference message indicating a preferred paging occasion subgroup of a UE; and transmit a paging occasion within a paging frame associated with the preferred paging occasion subgroup based on the paging occasion subgroup parameters.

The core network 130 may include a paging module 142. The paging module 142 may receive, from a UE, a request for a preferred assignment of a paging occasion subgroup; transmit, to a base station, the preferred assignment of the paging occasion subgroup; and transmit, to the UE, a response indicating whether the request is granted.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
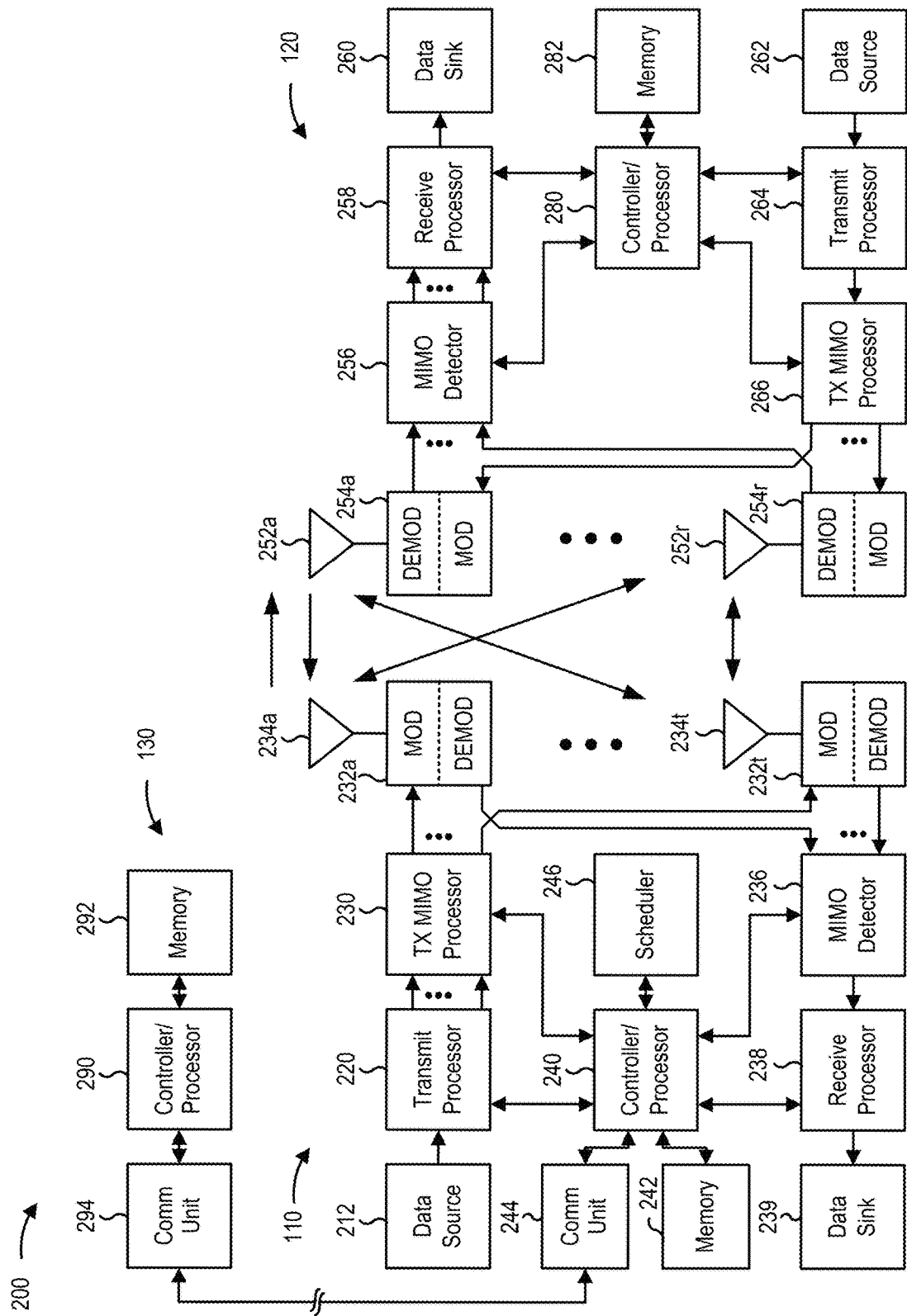
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with partitioning paging occasions as described in more detail elsewhere. For example, the controller/processor 240 of the base station 110, the controller/processor 280 of the UE 120, and/or any other component(s) of FIG. 2 may perform or direct operations of, for example, the process of FIG. 5 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for transmitting, to a core network, a request for a preferred assignment of a paging occasion subgroup; means for receiving, from the core network, a response indicating whether the request is granted; and means for monitoring a first paging occasion within a first paging frame associated with the paging occasion subgroup based on the response indicating the request is granted. Such means may include one or more components of the UE 120 described in connection with FIG. 2.

In some aspects, the base station 110 may include means for transmitting, via system information, a subgroup support message indicating support for paging occasion subgroups; means for transmitting, for each paging occasion subgroup supported by the base station, a set of paging occasion subgroup parameters; means for receiving a subgroup preference message indicating a preferred paging occasion subgroup of a user equipment (UE); and means for transmitting a paging occasion within a paging frame associated with the preferred paging occasion subgroup based on the paging occasion subgroup parameters. Such means may include one or more components of the base station 110 described in connection with FIG. 2.

In some aspects, the core network 130 may include means for receiving, from a user equipment (UE), a request for a preferred assignment of a paging occasion subgroup; means for transmitting, to a base station, the preferred assignment of the paging occasion subgroup; and means for transmitting, to the UE, a response indicating whether the request is granted. Such means may include one or more components of the base station 110 described in connection with FIG. 2.

As indicated above, FIG. 2 is provided merely as an example. Other examples may differ from what is described with regard to FIG. 2.

As discussed, in conventional wireless communication systems, UEs may be indifferently assigned to one of the paging occasions based on a respective UE_ID. It may be desirable to assign one or more UEs to a specific set of paging occasions to enable one or more features at a UE and/or a network associated with the UE.

In some examples, it may be desirable to assign one or more UEs to a specific set of paging occasions to enable cross-slot scheduling (CSS). CSS is a scheduling technique that may be specified to reduce UE power consumption. Specifically, CSS may allow a UE to wake up to receive a paging DCI. The UE may sleep after receiving the paging DCI, and then awaken one or more components of the transceiver to receive a paging PDSCH, after receiving the DCI. Some UEs do not support CSS for a paging PDSCH. In some examples, the network cannot use CSS for the paging PDSCH when a UE that supports CSS shares a paging occasion with a UE that does not support CSS. Specifically, the UE that does not support CSS may be incapable of receiving a paging message, if the paging message is multiplexed in a single PDSCH with another paging message specified for the UE that supports CSS. In such examples, the network may schedule a paging DCI and a paging PDSCH in a same slot, thereby eliminating potential power savings for the UE that supports CSS. To attain the benefits of CSS, paging frames and/or paging occasions assigned to the UE that supports CSS may be different from paging frames and/or paging occasions assigned to the UE that does not support CSS. The network may assign different paging frames and/or paging occasions if the network is configured to assign a specific set of paging occasions to a UE, as opposed to indifferently assigning a paging occasion based on a UE_ID.

In other examples, it may be desirable to assign one or more UEs to a specific set of paging occasions to align a synchronization signal block (SSB) and a paging occasion. In most cases, a UE measures one or more SSBs before an assigned paging occasion. As an example, the UE may measure the one or more SSBs to determine whether it is connected to a same serving cell and/or to calibrate its timing. In some wireless communication systems, such as an NR communication system, SSBs may be periodically transmitted, with a periodicity of 5 ms, 10 ms, 20 ms, 40 ms, or 80 ms. Thus, multiple SSBs may be available within one paging cycle. Still, in some cases, based on a transmission periodicity of the SSB and a number of paging frames in a paging cycle, a paging frame may not contain an SSB. In such cases, a UE receives the paging occasion in the paging frame and the SSB in another frame. The UE may remain awake between receiving the paging occasion and the SSB, thereby increasing the UE's power consumption. In contrast, the UE's power consumption may be reduced if the paging frame includes one or more SSBs or if timing between the paging frame and a frame including the SSB is reduced. However, some UEs are not power sensitive. Therefore, the discussed SSB and paging occasion alignment may be selectively applied to paging frames assigned to power-sensitive UEs. Non-power-sensitive UEs may be assigned paging frames according to legacy procedures (for example, based on UE_ID).

In other examples, it may be desirable to assign one or more UEs to a specific set of paging occasions to improve coverage for a paging PDSCH. In such examples, coverage improvements may be specified for UEs having reduced reception capabilities (for example, a reduced number of receive (Rx) branches). A UE with a reduced reception capability may be referred to as a reduced capability UE. 3GPP Release 17 RedCap UEs and Release 18 eRedCap UEs are examples of reduced capability UEs. In some cases, coverage for a reduced capability UE may be improved by repeating one or more transmissions, such as the paging PDSCH. In such cases, the network may avoid scheduling reduced capability UEs with other UEs, to reduce network overhead. That is, by limiting the repetitions to transmissions specified for reduced capability UEs, the network may reduce a total number of transmissions, which may reduce network overhead. In some such cases, the network may avoid scheduling reduced capability UEs with other UEs by assigning different paging frames and paging occasions to the reduced capability UEs.

As discussed, aspects of the present disclosure partition specific paging occasions into one or more paging occasion subgroups based on one or more features supported by the paging occasion subgroup. The features may include, but are not limited to, the features discussed above, such as CSS, SSB alignment, and coverage improvements. A UE may be assigned to a particular paging occasion subgroup. That is, the partitioned paging occasions are not indifferently assigned based on a UE_ID.

Figure 3:
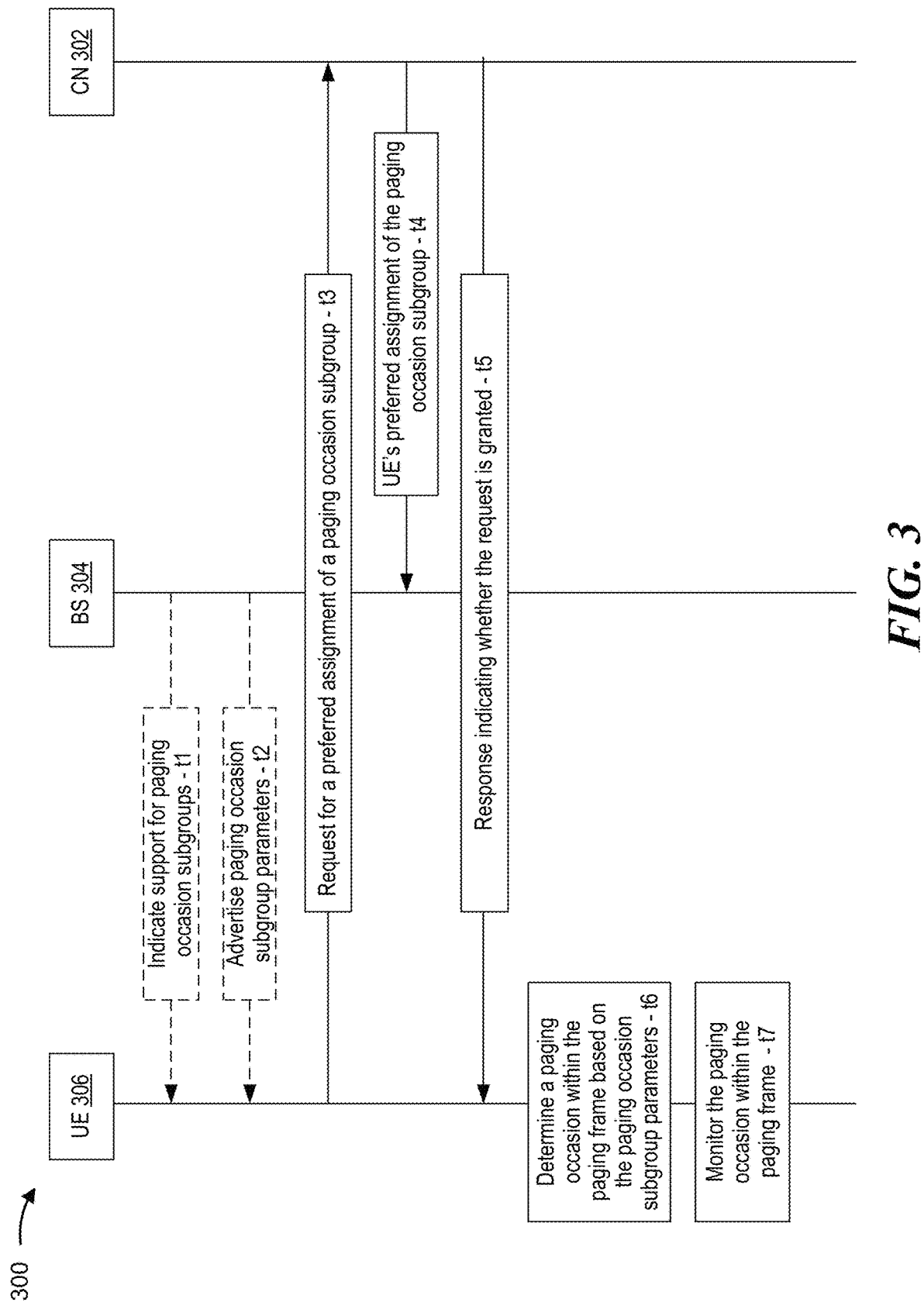
FIG. 3 is a timing diagram illustrating an example of monitoring a paging message of a preferred paging occasion subgroup, in accordance with aspects of the present disclosure.

FIG. 3 is a timing diagram illustrating an example 300 of monitoring a paging message of a preferred paging occasion subgroup, in accordance with aspects of the present disclosure. In the example 300 of FIG. 3, a wireless network includes a core network 302, a base station 304, and a UE 306. The UE 306 may be an example of one of the UEs 120 described with reference to FIGS. 1 and 2. The base station 304 may be an example of one of the base stations 110 described with reference to FIGS. 1 and 2. Additionally, the core network 302 may be an example of the core network 130 described with reference to FIGS. 1 and 2.

As shown in FIG. 3, at time t1, the base station 304 transmits a message indicating support for paging occasion subgroups. As discussed, in the current application, each paging occasion subgroup may be associated with a specific feature or a combination of features, such as CSS, SSB alignment, and coverage improvements. In some examples, the indication transmitted at time t1 may be advertised in system information. Additionally, the indication may specify support for one or more specific paging occasion subgroups, such as a subgroup for CSS, a subgroup for SSB alignment, and/or a subgroup for coverage improvements. Aspects of the present disclosure are not limited to the base station 304 indicating support for the paging occasion subgroups prior to the UE 306 registering with the core network 302 (time t3). The base station 304 may transmit one or more messages indicating the support for the paging occasion subgroups at various times before and after the UE 306 registers with the core network 302.

As shown in FIG. 3, at time t2, the base station 304 advertises paging occasion subgroup parameters for each paging occasion subgroup supported by the base station 304. The base station 304 does not advertise the paging occasion subgroup parameters if the base station 304 does not support paging occasion subgroups. In some implementations, the base station 304 advertises a tuple that includes a paging frame offset (PF_offset), a number of paging frames (N) within a paging cycle N, a number of paging occasions (Ns) within the paging cycle, and a starting physical downlink control channel (PDCCH) monitoring occasion number for each paging occasion within the paging frame (firstPDCCH-MonitoringOccasionOfPO). In contrast to conventional systems, the base station 304 may configure subgroup-specific values for the parameters included in the tuple. That is, each paging occasion subgroup may have different parameter values. The subgroup-specific values may be different in comparison to values for legacy parameters. In some examples, a value of a subgroup-specific paging frame offset may be different than a value of a legacy paging frame offset. In such examples, a set of paging occasions assigned to the paging occasion subgroup associated with the subgroup-specific paging frame offset may be disjointed from a set of paging occasions assigned to legacy UEs. In other examples, the value of the subgroup-specific paging frame offset may be the same as the value of the legacy paging frame offset. The base station 304, however may assign a different number of paging frames within a paging cycle to the paging occasion subgroup in comparison to the number of paging frames assigned to legacy UEs. In such examples, the paging occasion subgroup may share a subset of all configured paging occasions with the legacy UEs. Additionally, or alternatively, the base station 304 may assign a different number of paging occasions within a paging cycle in comparison to the number of paging occasions assigned to legacy UEs and/or a different starting PDCCH monitoring occasion number in comparison to the starting PDCCH monitoring occasion number assigned to legacy UEs.

In some other implementations, the base station 304 advertises the indices of paging frames and paging occasions that may be used by the paging occasion subgroup associated with the advertised paging occasion parameters. The paging frame indices may be indices of paging frames within a page cycle allocated for the paging occasion subgroup. In some examples, if more than one paging frame is allocated within a paging cycle (for example, N=4), the base station 304 may allocate one or more paging frames to different tasks. As an example, if four paging frames are allocated within the paging cycle, paging frames 1 and 3 may be allocated for SSB alignment, and paging frames 2 and 4 may be allocated for coverage improvements. Similar to the paging frame indices, the paging occasion indices may be indices of paging occasions within a paging frame. In some examples, if more than one paging occasion is allocated within a paging frame (for example, Ns=4), the base station 304 may allocate one or more paging occasions to different tasks. As an example, if four paging occasions are allocated within the paging frame, paging occasions 1 and 3 may be allocated for SSB alignment, and paging occasions 2 and 4 may be allocated for coverage improvements. Such examples of paging occasions may be limited to paging occasion subgroups that may share one or more paging occasions with the legacy UEs.

Aspects of the present disclosure are not limited to the base station 304 advertising paging occasion subgroup parameters for each paging occasion subgroup prior to the UE 306 registering with the core network 302 (time t3). The base station 304 may advertise the paging occasion subgroup parameters for each paging occasion subgroup at various times before and after the UE 306 registers with the core network 302.

As shown in FIG. 3, at time t3, the UE 306 transmits, to the core network 302, a request for a preferred assignment of a paging occasion subgroup. The preferred assignment of the paging occasion subgroup may be selected from a set of pre-defined paging occasion subgroups that may include subgroups for CSS, SSB alignment, coverage improvements, and/or any combination thereof, such as a subgroup for CSS and SSB alignment, a subgroup for CSS and coverage improvements, a subgroup for SSB alignment and coverage improvements, and/or a subgroup for CSS, SSB alignment and coverage improvements. Additionally, or alternatively, the preferred assignment of the paging occasion subgroup may be selected from subgroups that are supported by the base station 304. As discussed, the system information may indicate the subgroups supported by the base station 304. In some implementations, the request for the preferred assignment may be included in a registration request or a registration update transmitted to the core network 302. Aspects of the present disclosure are not limited to the UE 306 transmitting one request for a preferred assignment of a paging occasion subgroup. The UE 306 may transmit multiple requests for a preferred assignment of a paging occasion subgroup while connected to a network. The requests may be transmitted during and after a registration process. In some examples, the request may be transmitted based on the base station 304 indicating support for one or more paging occasion subgroups and/or updating the supported paging occasion subgroups.

As shown in FIG. 3, at time t4, the core network 302 may indicate the preferred assignment of the paging occasion subgroup for the UE 306 to the base station 304. In some examples, the preferred assignment for the UE 306 is included in a UE context transmitted from the core network 302 to the base station 304. In such examples, the UE context may be provided to the base station 304 after a radio resource control (RRC) connection is established. The preferred assignment for the UE 306 may be provided to the base station 304 if the base station 304 supports paging occasion subgroups. In some examples, the UE context may be modified by the core network 302 to include the preferred assignment for the UE 306. In other examples, the UE 306 may be in an RRC idle mode and a core network page may be pending for the UE 306. In such examples, the core network 302 may include the preferred assignment for the UE 306 in a paging notification transmitted to the base station 304. The base station 304 may then notify the UE 306 of the core network page. In some other examples, the UE 306 may be in an RRC inactive mode and a RAN page may be pending from a serving base station, such as the base station 304. In such examples, the serving base station may obtain preferred assignment for the UE 306 from an anchor base station associated with the UE 306, if the anchor base station supports paging occasion subgroups. Alternatively, if the anchor base station does not support paging occasion subgroups, the serving base station requests the preferred assignment for the UE 306 from the core network 302. The indication of time t4 may be transmitted in response to a request for the preferred assignment for the UE 306 from the serving base station (for example, base station 304). Although not shown in FIG. 4, the base station 304 may transmit an acknowledgement of the preferred assignment for the UE 306 based on receiving the preferred assignment for the UE 306 from the core network 302 at time t4. In some examples, the base station 304 may deny the request to support the preferred assignment for the UE 306. In such examples, the core network 302 may indicate the denial to the UE 306.

In the example 300 of FIG. 3, at time t5, the core network 302 transmits, to the UE 306, a response indicating whether the request for the preferred assignment is granted. The response transmitted at time t5 may be included in a response to the registration request or registration update request for the UE 306. In some examples, the core network 302 may deny the request for the preferred assignment if the preferred paging occasion subgroup is not supported by the core network 302 or the base station 304. In some implementations, the core network 302 also transmits a paging occasion assignment message (not shown in FIG. 4) to the base station 304 indicating an assignment of the paging occasion to the UE 306. In such implementations, the base station 304 may transmit an acknowledgement (not shown in FIG. 4) based on receiving the paging occasion assignment message.

In some examples, if the response indicates the request is not granted, the UE 306 may determine the paging frames and paging occasions are based on a legacy procedure, for example, based on the UE_ID. In other examples, if the response indicates the request is granted, the UE 306 may determine the paging frames and paging occasions based on the paging occasion subgroup parameters, such as the paging occasion subgroup parameters advertised by the base station 304 at time t2. In some examples, the UE 306 uses the values of the paging frame offset (PF_offset), the number of paging frames (N) within the paging cycle, the number of paging occasions (Ns) within the paging cycle, and the starting PDCCH monitoring occasion number for each paging occasion within the paging frame included in the tuple advertised by the base station 304. In such examples, the UE 306 may apply the values included in the tuple to legacy functions used to determine the paging frame and paging occasions.

As discussed, in other examples, the base station 304 advertises the indices of paging frames and paging occasions that may be used by a paging occasion subgroup. In such examples, if the base station 304 advertises more than one paging frame index, each paging frame may be eligible for use if the following equation is true for a paging frame index (i_PF) associated with the respective paging frame:

$$(SFN+PF\_offset) \bmod T = (T \text{ div } N)*(UE\_ID \bmod N)$$
and $$UE\_ID \bmod N = i\_PF. \quad (3)$$

Additionally, in such examples, if the base station 304 advertises more than one paging occasion index, each paging occasion may be eligible for use if the following equation is true for a paging occasion index (i_s) associated with the respective paging occasion:

$$i\_s = \text{floor}(UE\_ID/N) \bmod Ns. \quad (4)$$

In the current examples, the UE 306 may select a paging frame that satisfies EQUATION 3 and a paging occasion that satisfies EQUATION 4. After selecting the paging frame and the paging occasion, the UE 306 may monitor (time t7) the paging occasion within the paging frame selected at time t6. The paging frame may be received on a PDCCH transmitted by the base station 304 (not shown in FIG. 3).

As indicated above, FIG. 3 is provided as an example. Other examples may differ from what is described with respect to FIG. 3.

Figure 4:
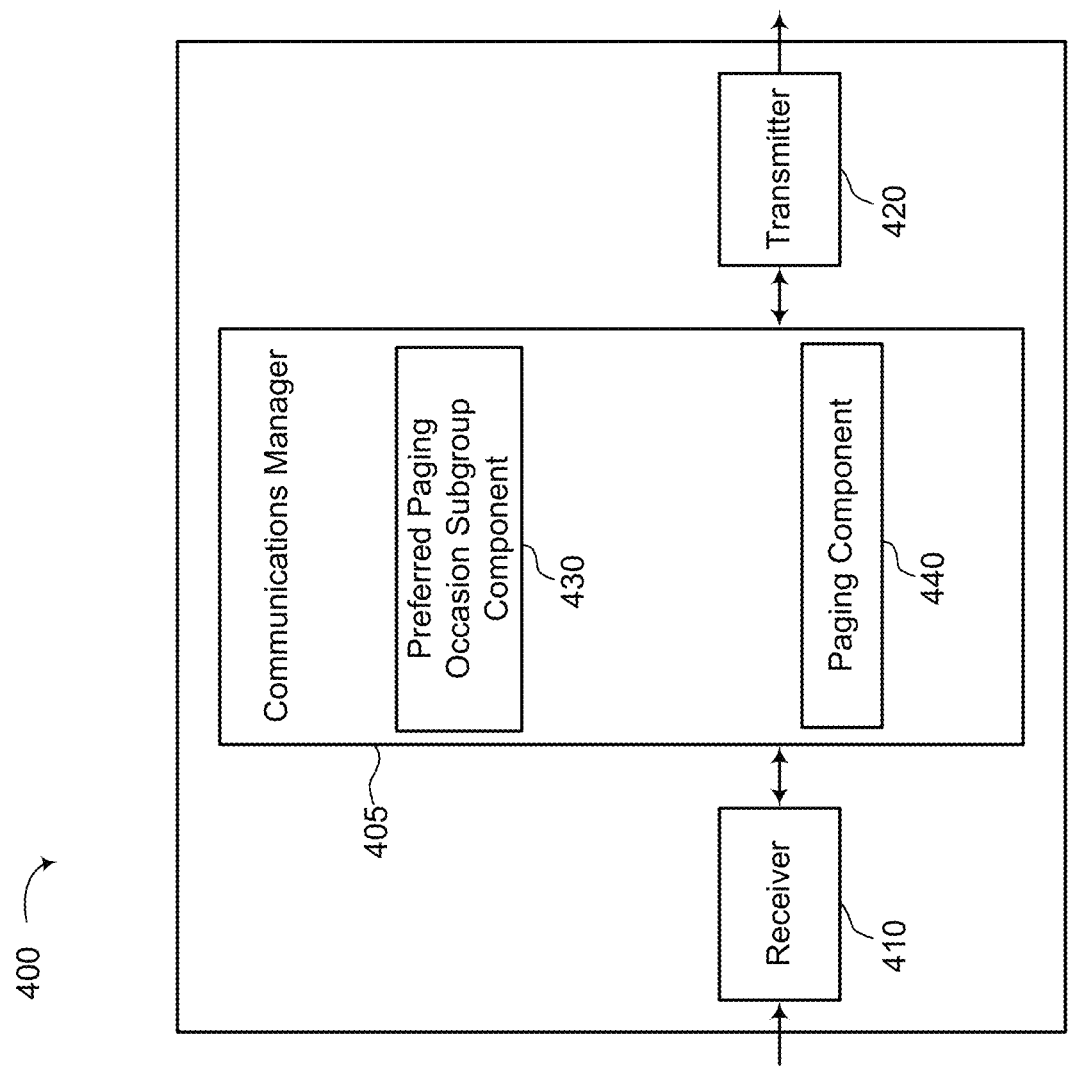
FIG. 4 is a block diagram illustrating an example of a wireless communication device that supports partitioning paging occasions into paging occasion subgroups, in accordance with aspects of the present disclosure.

FIG. 4 is a block diagram illustrating an example of a wireless communication device 400 that supports transmitting partitioning paging occasions into paging occasion subgroups, in accordance with aspects of the present disclosure. The device 400 may be an example of aspects of a UE 120 or a UE 306 described with reference to FIGS. 1, 2 and 3, respectively. The wireless communication device 400 may include a receiver 410, a communications manager 405, a transmitter 420, a granting preferred paging occasion subgroup component 430 and a paging component 440, which may be in communication with one another (for example, via one or more buses). In some examples, the wireless communication device 400 is configured to perform operations, including operations of the process 500 described below with reference to FIG. 5.

In some examples, the wireless communication device 400 can include a chip, chipset, package, or device that includes at least one processor and at least one modem (for example, a 5G modem or other cellular modem). In some examples, the communications manager 405, or its subcomponents, may be separate and distinct components. In some examples, at least some components of the communications manager 405 are implemented at least in part as software stored in a memory. For example, portions of one or more of the components of the communications manager 405 can be implemented as non-transitory code executable by the processor to perform the functions or operations of the respective component.

The receiver 410 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a PDCCH) and data channels (for example, a PDSCH). The other wireless communication devices may include, but are not limited to, a base station 110 and/or a core network 130 described with reference to FIGS. 1 and 2.

The received information may be passed on to other components of the device 400. The receiver 410 may be an example of aspects of the receive processor 258 described with reference to FIG. 2. The receiver 410 may include a set of radio frequency (RF) chains that are coupled with or otherwise utilize a set of antennas (for example, the set of antennas may be an example of aspects of the antennas 252a through 252r described with reference to FIG. 2).

The transmitter 420 may transmit signals generated by the communications manager 405 or other components of the wireless communication device 400. In some examples, the transmitter 420 may be collocated with the receiver 410 in a transceiver. The transmitter 420 may be an example of aspects of the transmit processor 264 described with reference to FIG. 2. The transmitter 420 may be coupled with or otherwise utilize a set of antennas (for example, the set of antennas may be an example of aspects of the antennas 252a through 252r described with reference to FIG. 2), which may be antenna elements shared with the receiver 410. In some examples, the transmitter 420 is configured to transmit control information in a physical uplink control channel (PUCCH) and data in a physical uplink shared channel (PUSCH).

The communications manager 405 may be an example of aspects of the controller/processor 280 described with reference to FIG. 2. The communications manager 405 may include the preferred paging occasion subgroup component 430 and the paging component 440. In some implementations, working in conjunction with the transmitter 420, the preferred paging occasion subgroup component 430 may transmit, to a core network, a request for a preferred assignment of a paging occasion subgroup. Working in conjunction with the receiver 410, the preferred paging occasion subgroup component 430 may receive from the core network, a response indicating whether the request is granted. Additionally, working in conjunction with the receiver and the preferred paging occasion subgroup component 430, the paging component 440 may monitor a first paging occasion within a first paging frame associated with the paging occasion subgroup based on the response indicating the request is granted.

Figure 5:
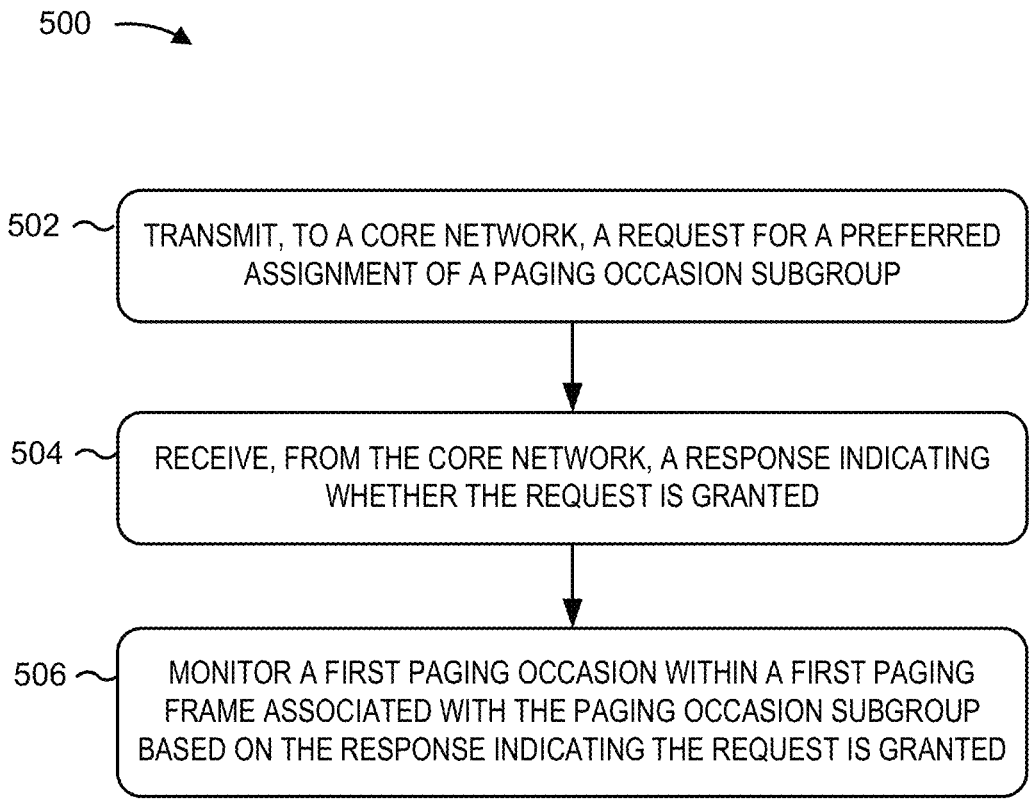
FIG. 5 is a flow diagram illustrating an example process performed, for example, by a user equipment (UE), in accordance with various aspects of the present disclosure.

FIG. 5 is a flow diagram illustrating an example process 500 performed, for example, by a user equipment (UE), in accordance with various aspects of the present disclosure. In some implementations, the process 500 may be performed by a wireless communication device operating as or within a UE, such as a UE 120 or a UE 306 as described in FIGS. 1, 2, and 3, respectively. The example process 500 is an example of partitioning paging occasions into paging occasion subgroups. As shown in FIG. 5, the process 500 begins at block 502 by transmitting, to a core network, a request for a preferred assignment of a paging occasion subgroup. In some examples, the request may be transmitted in a registration request or a registration update request.

At block 504, the process 500 receives, from the core network, a response indicating whether the request is granted. The response may be transmitted in message granting the registration request or the registration update request. At block 506, the process 500 monitors a first paging occasion within a first paging frame associated with the paging occasion subgroup based on the response indicating the request is granted. In some examples, the UE may receive, from a base station, paging occasion subgroup parameters associated with the paging occasion subgroup. The paging occasion subgroup parameters may be received before, or after, transmitting the request at block 502. In some examples, the response indicates the request is not granted, and the method further comprises monitoring a second paging occasion within a second paging frame assigned based on an identifier (ID) of the UE. In other examples, the response indicates the request is granted. In such examples, UE may determine the first paging occasion within the first paging frame based on the paging occasion subgroup parameters. The paging occasion subgroup parameters may be specific to a paging occasion subgroup. In some examples, the paging occasion subgroup parameters may indicate a paging frame offset, a number of paging frames within a paging cycle, a number of paging occasions within each paging frame of the paging cycle, and a paging occasion starting physical downlink control channel (PDCCH) monitoring occasion number. In some other examples, the paging occasion subgroup parameters indicate one or more paging frame indices and one or more paging occasion indices available to the paging occasion subgroup.

Figure 6:
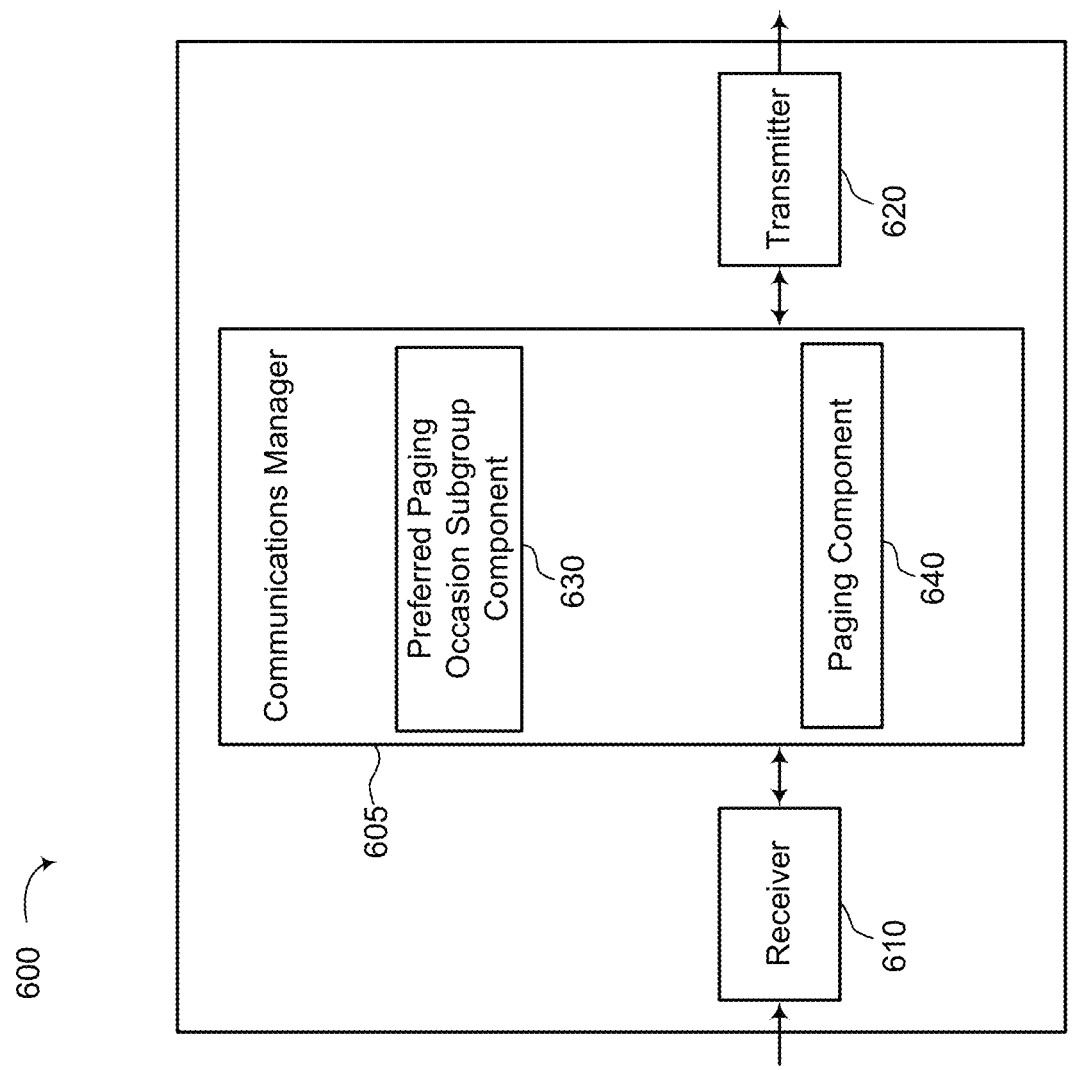
FIG. 6 is a block diagram illustrating an example of a wireless communication device that supports partitioning paging occasions into paging occasion subgroups, in accordance with aspects of the present disclosure.

FIG. 6 is a block diagram illustrating an example of a wireless communication device 600 that supports partitioning paging occasions into paging occasion subgroups, in accordance with aspects of the present disclosure. The device 600 may be an example of aspects of a base station, such as a base station 110 and a base station 304 described with reference to FIGS. 1, 2, and 3, respectively. The device 600 may implement an architecture for supporting paging occasion subgroups, in accordance with aspects of the present disclosure. The wireless communication device 600 may include a receiver 610, a communications manager 605, a transmitter 620, a preferred paging occasion subgroup component 630 and a paging component 640, which may be in communication with one another (for example, via one or more buses). In some examples, the wireless communication device 600 is configured to perform operations, including operations of the process 700 described below with reference to FIG. 7.

In some examples, the wireless communication device 600 can include a chip, chipset, package, or device that includes at least one processor and at least one modem (for example, a 5G modem or other cellular modem). In some examples, the communications manager 605, or its subcomponents, may be separate and distinct components. In some examples, at least some components of the communications manager 605 are implemented at least in part as software stored in a memory. For example, portions of one or more of the components of the communications manager 605 can be implemented as non-transitory code executable by the processor to perform the functions or operations of the respective component.

The receiver 610 may receive one or more of signals, control information and data information, such as in the form of packets, from one or more other wireless communication devices via various channels, including control channels (for example, a PUCCH) and data channels (for example, a PUSCH). The other wireless communication devices may include, but are not limited to, a UE 120 and a core network 130 as described with reference to FIG. 1. In aspects of the present disclosure, the wireless communication device 600 may forward and receive information via a backhaul connection.

The device 600 may pass received information to other components of the device 600. The receiver 610 may be an example of aspects of the receive processor 238 described with reference to FIG. 2. The receiver 610 may include a set of RF chains that are coupled with or otherwise utilize a set of antennas (for example, the set of antennas may be an example of aspects of the antennas 234a through 234t described with reference to FIG. 2).

The transmitter 620 may transmit signals generated by the communications manager 605 or other components of the wireless communication device 600. In some examples, the transmitter 620 may be collocated with the receiver 610 in a transceiver. The transmitter 620 may be an example of aspects of the transmit processor 220 described with reference to FIG. 2. The transmitter 620 may be coupled with or otherwise utilize a set of antennas (for example, the set of antennas may be an example of aspects of the antennas 234a through 234t described with reference to FIG. 2), which may be antenna elements shared with the receiver 610. In some examples, the transmitter 620 is configured to transmit control information in a PDCCH and data in a PDSCH.

The communications manager 605 may be an example of aspects of the controller/processor 240 described with reference to FIG. 2. The communications manager 605 may include the preferred paging occasion subgroup component 630 and the paging component 640. In some implementations, working in conjunction with the transmitter 620, the preferred paging occasion subgroup component 630 may transmitting, via system information, a subgroup support message indicating support for paging occasion subgroups and also transmit, for each paging occasion subgroup supported by the base station, a set of paging occasion subgroup parameters. Furthermore, working in conjunction with the receiver 610, the preferred paging occasion subgroup component 630 may receive a subgroup preference message indicating a preferred paging occasion subgroup of a UE. Additionally, working in conjunction with the transmitter 620 and the preferred paging occasion subgroup component 630, the paging component 640 may transmit a paging occasion within a paging frame associated with the preferred paging occasion subgroup based on the paging occasion subgroup parameters.

Figure 7:
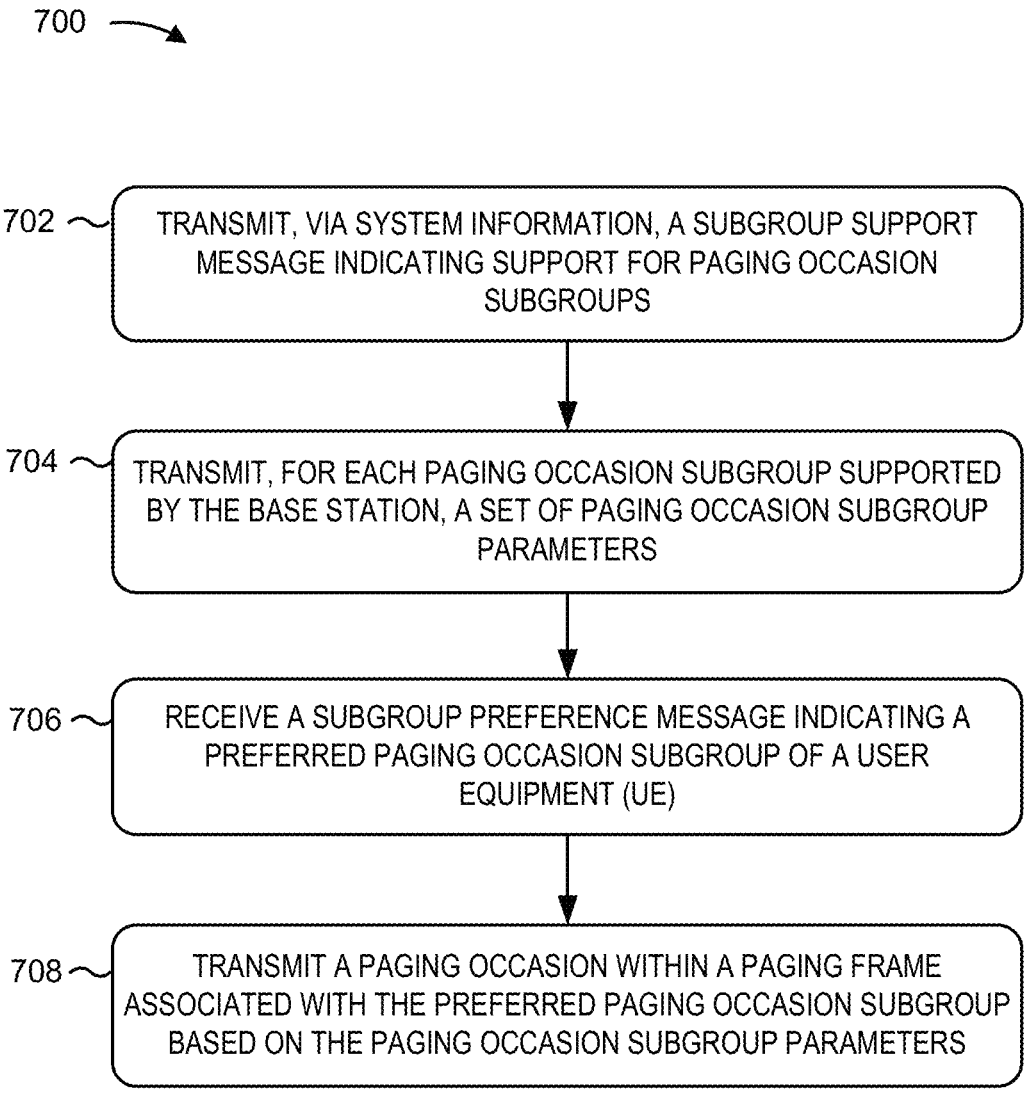
FIG. 7 is a flow diagram illustrating an example process performed, for example, by a base station, in accordance with various aspects of the present disclosure.

FIG. 7 is a flow diagram illustrating an example process 700 performed, for example, by a base station, in accordance with various aspects of the present disclosure. The example process 700 is an example of partitioning paging occasions into paging occasion subgroups In some implementations, the process 700 may be performed by a wireless communication device operating as or within a base station, such as a base station 110 or a base station 304 as described in FIGS. 1, 2, and 3, respectively.

As shown in FIG. 7, the process 700 may begin at block 702 by transmitting, via system information, a subgroup support message indicating support for paging occasion subgroups. In some examples, the subgroup support message may also indicates a subset of paging occasion subgroups supported by the base station, the subset of paging occasion subgroups selected from a plurality of pre-defined paging occasion subgroups. At block 704, the process 700 may transmit, for each paging occasion subgroup supported by the base station, a set of paging occasion subgroup parameters. In some examples, the set of paging occasion subgroup parameters indicate a paging frame offset, a number of paging frames within a paging cycle, a number of paging occasions within each paging frame of the paging cycle, and a paging occasion starting physical downlink control channel (PDCCH) monitoring occasion number. In some other examples, the set of paging occasion subgroup parameters indicate one or more paging frame indices and one or more paging occasion indices.

At block 706, the process 700 receives a subgroup preference message indicating a preferred paging occasion subgroup of a UE. In some examples, the process 700 receives the subgroup preference message from a core network, via a UE context message, after establishing a radio resource control (RRC) connection. In some other examples, the process 700 receives the subgroup preference message from an anchor base station based on the anchor base station supporting the paging occasion subgroups. In still some other examples, the process 700 receives the subgroup preference message from a core network via a paging notification. In other examples, the process 700 transmits, to a core network, a request for the preferred paging occasion subgroup of the UE, the subgroup preference message being received based on transmitting the request. As shown in FIG. 7, at block 708, the process 700 transmits a paging occasion within a paging frame associated with the preferred paging occasion subgroup based on the paging occasion subgroup parameters.

Figure 8:
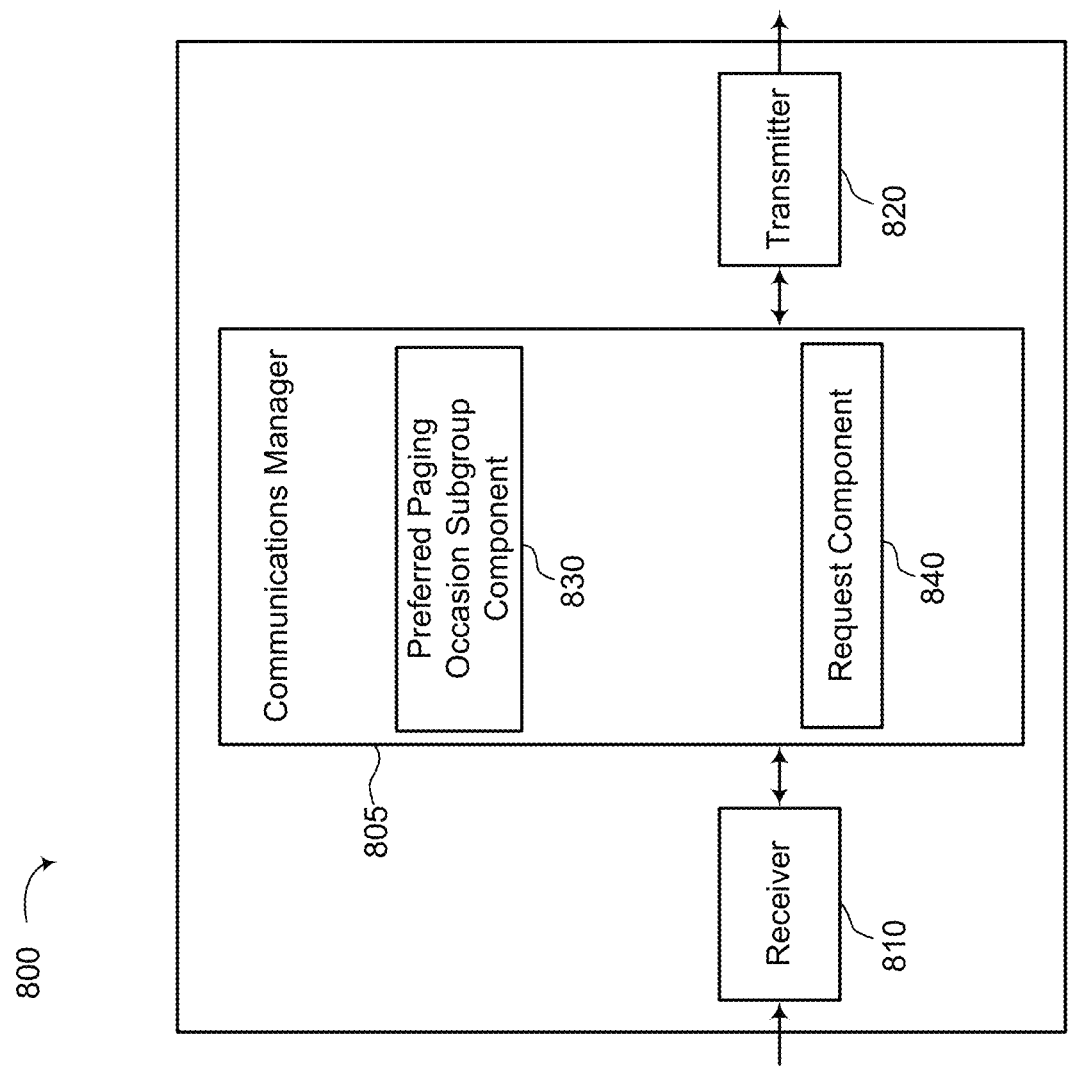
FIG. 8 is a block diagram illustrating an example of a wireless communication device that supports partitioning paging occasions into paging occasion subgroups, in accordance with aspects of the present disclosure.

FIG. 8 is a block diagram illustrating an example of a wireless communication device 800 that supports partitioning paging occasions into paging occasion subgroups, in accordance with aspects of the present disclosure. The device 800 may be an example of aspects of a base station, such as a core network 130 and a core network 302 described with reference to FIGS. 1, 2, and 3, respectively. The device 800 may implement an architecture for supporting paging occasion subgroups, in accordance with aspects of the present disclosure. The wireless communication device 800 may include a receiver 810, a communications manager 805, a transmitter 820, a preferred paging occasion subgroup component 830 and a request component 840, which may be in communication with one another (for example, via one or more buses). In some examples, the wireless communication device 800 is configured to perform operations, including operations of the process 900 described below with reference to FIG. 9.

In some examples, the wireless communication device 800 can include a chip, chipset, package, or device that includes at least one processor and at least one modem (for example, a 5G modem or other cellular modem). In some examples, the communications manager 805, or its subcomponents, may be separate and distinct components. In some examples, at least some components of the communications manager 805 are implemented at least in part as software stored in a memory. For example, portions of one or more of the components of the communications manager 805 can be implemented as non-transitory code executable by the processor to perform the functions or operations of the respective component.

The receiver 810 may receive one or more of signals, control information and data information, such as in the form of packets, from one or more other wireless communication devices via various channels, including control channels (for example, a PUCCH) and data channels (for example, a PUSCH). The other wireless communication devices may include, but are not limited to, a UE 120 and a base station 110 as described with reference to FIG. 1. In aspects of the present disclosure, the wireless communication device 800 may forward and receive information via a backhaul connection.

The device 800 may pass received information to other components of the device 800. The receiver 810 may be an example of aspects of the receive processor 238 described with reference to FIG. 2. The receiver 810 may include a set of RF chains that are coupled with or otherwise utilize a set of antennas (for example, the set of antennas may be an example of aspects of the antennas 234a through 234t described with reference to FIG. 2).

The transmitter 820 may transmit signals generated by the communications manager 805 or other components of the wireless communication device 800. In some examples, the transmitter 820 may be collocated with the receiver 810 in a transceiver. The transmitter 820 may be an example of aspects of the transmit processor 220 described with reference to FIG. 2. The transmitter 820 may be coupled with or otherwise utilize a set of antennas (for example, the set of antennas may be an example of aspects of the antennas 234a through 234t described with reference to FIG. 2), which may be antenna elements shared with the receiver 810. In some examples, the transmitter 820 is configured to transmit control information in a PDCCH and data in a PDSCH.

The communications manager 805 may be an example of aspects of the controller/processor 290 described with reference to FIG. 2. The communications manager 805 may include the preferred paging occasion subgroup component 830 and the request component 840. In some implementations, working in conjunction with the receiver 810, the preferred paging occasion subgroup component 830 may receive, from a user equipment (UE), a request for a preferred assignment of a paging occasion subgroup. Additionally, working in conjunction with the transmitter 820, the preferred paging occasion subgroup component 830 may transmit, to a base station, the preferred assignment of the paging occasion subgroup. Finally, working in conjunction with the transmitter 820 and the preferred paging occasion subgroup component 830, the request component 840 may transmit, to the UE, a response indicating whether the request is granted.

Figure 9:
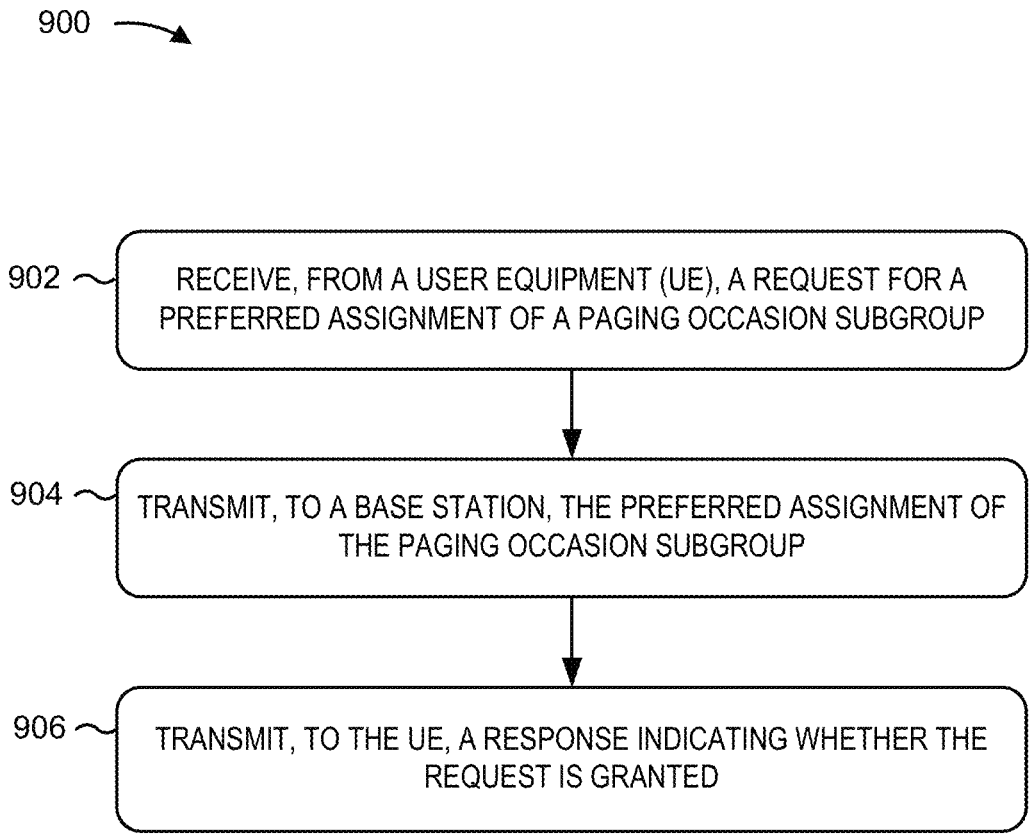
FIG. 9 is a flow diagram illustrating an example process performed, for example, by a core network, in accordance with various aspects of the present disclosure.

FIG. 9 is a flow diagram illustrating an example process 900 performed, for example, by a core network, in accordance with various aspects of the present disclosure. The example process 900 is an example of partitioning paging occasions into paging occasion subgroups In some implementations, the process 900 may be performed by a wireless communication device operating as or within a core network, such as a core network 130 or a core network 302 as described in FIGS. 1, 2, and 3, respectively.

As shown in FIG. 9, the process 900 begins at block 902 by receiving, from a UE, a request for a preferred assignment of a paging occasion subgroup. At block 904, the process 900 transmits, to a base station, the preferred assignment of the paging occasion subgroup. In some examples, the preferred assignment may be transmitted to the base station, via a UE context message, after establishing a radio resource control (RRC) connection. In some other examples, the preferred assignment may be transmitted via a paging notification. In still some other examples, the base station is an anchor base station. In yet other examples, the process 900 receives, from the base station, a preferred assignment request for the preferred assignment, such that the preferred assignment is transmitted based on receiving the preferred assignment request. In some other examples, the process 900 modifies the UE context message based on receiving the preferred assignment and transmits the preferred assignment, via the modified UE context message, to the base station.

At block 906, the process 900 transmits, to the UE, a response indicating whether the request is granted. In some examples, the process 900 may also transmit, to the base station, a paging occasion assignment message indicating assignment of the paging occasion subgroup to the UE, and receive, from the base station, an acknowledgement based on transmitting the paging occasion assignment message Implementation examples are described in the following numbered clauses.

Clause 1. A method for wireless communication performed by a user equipment (UE), comprising: transmitting, to a core network, a request for a preferred assignment of a paging occasion subgroup; receiving, from the core network, a response indicating whether the request is granted; and monitoring a first paging occasion within a first paging frame associated with the paging occasion subgroup based on the response indicating the request is granted.

Clause 2. The method of Clause 1, further comprising: receiving, from a base station, paging occasion subgroup parameters associated with the paging occasion subgroup; and determining the first paging occasion within the first paging frame based on the paging occasion subgroup parameters.

Clause 3. The method of Clause 2, in which the paging occasion subgroup parameters indicate a paging frame offset, a number of paging frames within a paging cycle, a number of paging occasions within each paging frame of the paging cycle, and a paging occasion starting physical downlink control channel (PDCCH) monitoring occasion number.

Clause 4. The method of Clause 2, in which the paging occasion subgroup parameters are specific to the paging occasion subgroup.

Clause 5. The method of Clause 2, in which the paging occasion subgroup parameters indicate one or more paging frame indices and one or more paging occasion indices available to the paging occasion subgroup.

Clause 6. The method of any one of Clauses 1-5, in which the request is transmitted in a registration request or a registration update request.

Clause 7. The method of any one of Clauses 1-6, in which the response indicates the request is not granted, and the method further comprises monitoring a second paging occasion within a second paging frame assigned based on an identifier (ID) of the UE.

Clause 8. A method for wireless communication performed by a base station, comprising: transmitting, via system information, a subgroup support message indicating support for paging occasion subgroups; transmitting, for each paging occasion subgroup supported by the base station, a set of paging occasion subgroup parameters; receiving a subgroup preference message indicating a preferred paging occasion subgroup of a user equipment (UE); and transmitting a paging occasion within a paging frame associated with the preferred paging occasion subgroup based on the paging occasion subgroup parameters.

Clause 9. The method of Clause 8, further comprising receiving the subgroup preference message from a core network, via a UE context message, after establishing a radio resource control (RRC) connection.

Clause 10. The method of Clause 8, further comprising receiving the subgroup preference message from a core network via a paging notification.

Clause 11. The method of Clause 8, further comprising receiving the subgroup preference message from an anchor base station based on the anchor base station supporting the paging occasion subgroups.

Clause 12. The method of Clause 8, further comprising transmitting, to a core network, a request for the preferred paging occasion subgroup of the UE, the subgroup preference message being received based on transmitting the request.

Clause 13. The method of any one of Clauses 8-12, in which the set of paging occasion subgroup parameters indicate a paging frame offset, a number of paging frames within a paging cycle, a number of paging occasions within each paging frame of the paging cycle, and a paging occasion starting physical downlink control channel (PDCCH) monitoring occasion number.

Clause 14. The method of any one of Clauses 8-12, in which the set of paging occasion subgroup parameters indicate one or more paging frame indices and one or more paging occasion indices.

Clause 15. The method of any one of Clauses 8-14, in which the subgroup support message further indicates a subset of paging occasion subgroups supported by the base station, the subset of paging occasion subgroups selected from a plurality of pre-defined paging occasion subgroups.

Clause 16. A method for wireless communication performed by a core network, comprising: receiving, from a user equipment (UE), a request for a preferred assignment of a paging occasion subgroup; transmitting, to a base station, the preferred assignment of the paging occasion subgroup; and transmitting, to the UE, a response indicating whether the request is granted.

Clause 17. The method of Clause 16, further comprising transmitting the preferred assignment to the base station, via a UE context message, after establishing a radio resource control (RRC) connection.

Clause 18. The method of Clause 16, further comprising transmitting the preferred assignment via a paging notification.

Clause 19. The method of Clause 16, in which the base station is an anchor base station.

Clause 20. The method of Clause 16, further comprising receiving, from the base station, a preferred assignment request for the preferred assignment, the preferred assignment being transmitted based on the preferred assignment request.

Clause 21. The method of any one of Clauses 16-20, further comprising determining whether the preferred assignment is supported by the core network or the base station, the response indicating the request is not granted based on the preferred assignment being unsupported by the core network or the base station.

Clause 22. The method of any one of Clauses 16-21, further comprising: modifying the UE context message based on receiving the preferred assignment; and transmitting the preferred assignment, via the modified UE context message, to the base station.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a user equipment (UE), comprising:
   receiving, from a network node associated with a core network, a first message identifying a set of paging occasion subgroups supported by the network node;
   selecting, in accordance with receiving the first message, a specific paging occasion subgroup, of the set of paging occasion subgroups, corresponding to a paging configuration associated with the UE, the paging configuration being based on: whether each of the plurality of paging occasion subgroups associated with cross-slot scheduling (CSS) is enabled at the UE, whether the UE is a power sensitive UE, and/or whether the UE is a reduced capability UE;
   transmitting, to the core network, a second message indicating a request for a preferred assignment of the specific paging occasion subgroup in accordance with selecting the specific paging occasion subgroup;
   receiving, from the core network, a response indicating that the preferred assignment is granted in accordance with transmitting the second message; and
   monitoring a first paging occasion within a first paging frame associated with the specific paging occasion subgroup based on the response indicating the request is granted.

2. The method of claim 1, further comprising:
   receiving, from a base station, a third message indicating one or more paging occasion subgroup parameters, each of the one or more paging occasion subgroup parameters associated with a respective paging occasion subgroup of the set of paging occasion subgroups; and determining the first paging occasion within the first paging frame based on the respective paging occasion subgroup parameters associated with the specific paging occasion subgroup.

3. The method of claim 2, in which each of the one or more paging occasion subgroup parameters indicate a paging frame offset, a number of paging frames within a paging cycle, a number of paging occasions within each paging frame of the paging cycle, and a paging occasion starting physical downlink control channel (PDCCH) monitoring occasion number.

4. The method of claim 2, in which each of the one or more paging occasion subgroup parameters are specific to the paging occasion subgroup.

5. The method of claim 2, in which each of the one or more paging occasion subgroup parameters indicates one or more paging frame indices and one or more paging occasion indices available to the paging occasion subgroup.

6. The method of claim 1, in which the second message is transmitted in a registration request or a registration update request.

7. The method of claim 1, in which the response indicates the preferred assignment is not granted, and the method further comprises monitoring a second paging occasion within a second paging frame assigned based on an identifier (ID) of the UE.

8. An apparatus for wireless communications at a user equipment (UE), comprising:
one or more processors;
one or more memories coupled with the one or more processors; and
instructions stored in the one or more memories and operable, when executed by the one or more processors, to cause the apparatus to:
receive, from a network node associated with a core network, a first message identifying a set of paging occasion subgroups supported by the network node;
select, in accordance with receiving the first message, a specific paging occasion subgroup, of the set of paging occasion subgroups, corresponding to a paging configuration associated with the UE, the paging configuration being based on: whether each of the plurality of paging occasion subgroups associated with cross-slot scheduling (CSS) is enabled at the UE, whether the UE is a power sensitive UE, and/or whether the UE is a reduced capability UE
transmit, to the core network, a second message indicating a request for a preferred assignment of the specific paging occasion subgroup in accordance with selecting the specific paging occasion subgroup;
receive, from the core network, a response indicating that the preferred assignment is granted in accordance with transmitting the second message; and
monitor a first paging occasion within a first paging frame associated with the specific paging occasion subgroup based on the response indicating the request is granted.

9. The apparatus of claim 8, in which execution of the instructions further cause the apparatus to:
receive, from a base station, a third message indicating one or more paging occasion subgroup parameters, each of the one or more paging occasion subgroup parameters associated with a respective paging occasion subgroup of the set of paging occasion subgroups; and determine the first paging occasion within the first paging frame based on the respective paging occasion subgroup parameters associated with the specific paging occasion subgroup.

10. The apparatus of claim 9, in which each of the one or more paging occasion subgroup parameters indicate a paging frame offset, a number of paging frames within a paging cycle, a number of paging occasions within each paging frame of the paging cycle, and a paging occasion starting physical downlink control channel (PDCCH) monitoring occasion number.

11. The apparatus of claim 9, in which each of the one or more paging occasion subgroup parameters are specific to the paging occasion subgroup.

12. The apparatus of claim 9, in which each of the one or more paging occasion subgroup parameters indicates one or more paging frame indices and one or more paging occasion indices available to the paging occasion subgroup.

13. The apparatus of claim 8, in which the second message is transmitted in a registration request or a registration update request.

14. The apparatus of claim 8, in which the response indicates the preferred assignment is not granted, and the method further comprises monitoring a second paging occasion within a second paging frame assigned based on an identifier (ID) of the UE.

15. A method for wireless communication performed by a base station, comprising:
transmitting, to a user equipment (UE) via system information, a subgroup support message indicating support for a set of paging occasion subgroups;
transmitting, to the UE for each paging occasion subgroup supported by the base station, a set of paging occasion subgroup parameters;
receiving, from a network node, a subgroup preference message indicating a request for a specific paging occasion subgroup of the UE, the specific paging occasion subgroup corresponding to a paging configuration associated with the UE, the paging configuration being based on: whether cross-slot scheduling (CSS) is enabled at the UE, whether the UE is power sensitive, and/or whether the UE is a reduced capability UE;
determining to accept the request for the specific paging occasion subgroup in accordance with the received subgroup preference message; and
transmitting a paging occasion to the UE within a paging frame associated with the specific paging occasion subgroup in accordance with the paging occasion subgroup parameters upon determining to accept the request for the specific paging occasion subgroup.

16. The method of claim 15, further comprising receiving the subgroup preference message, via a UE context message, after establishing a radio resource control (RRC) connection, in which the network node is a core network.

17. The method of claim 15, further comprising receiving the subgroup preference message via a paging notification, in which the network node is a core network.

18. The method of claim 15, further comprising receiving the subgroup preference message based on the network node supporting the paging occasion subgroups, in which the network node is an anchor base station.

19. The method of claim 15, further comprising transmitting, to a core network, a request for the specific paging occasion subgroup of the UE, the subgroup preference message being received based on transmitting the request.

20. The method of claim 15, in which the set of paging occasion subgroup parameters indicate a paging frame offset, a number of paging frames within a paging cycle, a number of paging occasions within each paging frame of the paging cycle, and a paging occasion starting physical downlink control channel (PDCCH) monitoring occasion number.

21. The method of claim 15, in which the set of paging occasion subgroup parameters indicate one or more paging frame indices and one or more paging occasion indices.

22. The method of claim 15, in which the subgroup support message further indicates a subset of paging occasion subgroups supported by the base station, the subset of paging occasion subgroups selected from a plurality of pre-defined paging occasion subgroups.

23. A method for wireless communication performed by a core network, comprising:
receiving, from a user equipment (UE), a first message indicating a preferred assignment of a specific paging occasion subgroup of a plurality of paging occasion subgroups, the specific paging occasion subgroup corresponding to a paging configuration associated with the UE, the paging configuration being based on: whether cross-slot scheduling (CSS) is enabled at the UE, whether the UE is power sensitive, and/or whether the UE is a reduced capability UE;
modifying a UE context message based on receiving the preferred assignment;
transmitting, to a network node, a subgroup preference message indicating a request by the UE for the specific paging occasion subgroup;
determining that the preferred assignment is supported by the core network or the a base station; and
transmitting, to the UE, a response indicating that the preferred assignment is granted upon determining that the preferred assignment is supported.

24. The method of claim 23, further comprising transmitting the preferred assignment to the network node, via the UE context message, after establishing a radio resource control (RRC) connection.

25. The method of claim 23, further comprising transmitting the preferred assignment via a paging notification.

26. The method of claim 23, in which the network node is an anchor base station.

27. The method of claim 23, further comprising receiving, from the base station, a preferred assignment request for the preferred assignment, the preferred assignment being transmitted based on receiving the preferred assignment request.

28. The method of claim 23, wherein the response indicates the preferred assignment is not granted based on the specific paging occasion subgroup being unsupported by the core network or the network node.

29. The method of claim 23, further comprising:
transmitting the preferred assignment, via the modified UE context message, to the network node.

30. The method of claim 23, further comprising:
transmitting, to the network node, a paging occasion assignment message indicating assignment of the specific paging occasion subgroup to the UE; and
receiving, from the base station, an acknowledgement based on transmitting the paging occasion assignment message.

* * * * *